US012668488B2

(12) United States Patent
Babovic et al.

(10) Patent No.: US 12,668,488 B2
(45) Date of Patent: Jun. 30, 2026

(54) STEAM REFORMING

(71) Applicant: Johnson Matthey Davy Technologies Limited, London (GB)

(72) Inventors: Mileta Babovic, Billingham (GB); Mikael Carlsson, Billingham (GB); Mark Alexander Kent, Billingham (GB); Andrew Edward Richardson, Billingham (GB)

(73) Assignee: Johnson Matthey Davy Technologies Limited, London (GB)

( * ) Notice: Subject to any disclaimer, the term of this patent is extended or adjusted under 35 U.S.C. 154(b) by 534 days.

(21) Appl. No.: 18/002,998

(22) PCT Filed: Jul. 22, 2021

(86) PCT No.: PCT/GB2021/051891
§ 371 (c)(1),
(2) Date: Dec. 22, 2022

(87) PCT Pub. No.: WO2022/034283
PCT Pub. Date: Feb. 17, 2022

(65) Prior Publication Data
US 2023/0322551 A1      Oct. 12, 2023

(30) Foreign Application Priority Data

Aug. 13, 2020      (GB) ..................................... 2012613

(51) Int. Cl.
C01B 3/326 (2026.01)

(52) U.S. Cl.
CPC ...... C01B 3/326 (2013.01); *C01B 2203/0233* (2013.01); *C01B 2203/0811* (2013.01);
(Continued)

(58) Field of Classification Search
CPC ... C01B 2203/0233; C01B 3/384; C01B 3/40; C01B 2203/0811; C01B 2203/1017;
(Continued)

(56) References Cited

U.S. PATENT DOCUMENTS 4,259,302 A * 3/1981 Katz ...................... B01D 53/58
                                                        429/410
5,498,404 A   3/1996 Hansen et al.
(Continued)

FOREIGN PATENT DOCUMENTS

EP            3453451 A1      3/2019
GB            2536996 A      10/2016
(Continued)

OTHER PUBLICATIONS

Faramawy, S., Zaki, T., & Sakr, A. A.-E. (2016). Natural gas origin, composition, and processing: A Review. Journal of Natural Gas Science and Engineering, 34, 34-54. https://doi.org/10.1016/j.jngse.2016.06.030 (Year: 2016).*
(Continued)

*Primary Examiner* — Paul A Wartalowicz
*Assistant Examiner* — Slone Elizabeth Simkins
(74) *Attorney, Agent, or Firm* — BakerHostetler

(57) ABSTRACT

A process is described for steam reforming a hydrocarbon feedstock containing one or more nitrogen compounds, comprising passing a mixture of the hydrocarbon feedstock and steam through a catalyst bed consisting of one nickel steam reforming catalysts disposed within a plurality of externally heated tubes in a tubular steam reformer, wherein each tube has an inlet to which the mixture of hydrocarbon and steam is fed, an outlet from which a reformed gas containing hydrogen, carbon monoxide, carbon dioxide, steam, ammonia and methane is recovered, and the steam reforming catalyst at least at the outlet of the tubes is a
(Continued)

particulate eggshell steam reforming catalyst comprising 2.5 to 9.5% by weight nickel, expressed as NiO, wherein the nickel is provided in a layer at the surface of the catalyst and the thickness of layer is in the range of 100 to 1000 μm.

24 Claims, 3 Drawing Sheets

(52) U.S. Cl.
CPC ............... *C01B 2203/0872* (2013.01); *C01B 2203/1058* (2013.01); *C01B 2203/1082* (2013.01); *C01B 2203/1614* (2013.01); *C01B 2203/1638* (2013.01)

(58) Field of Classification Search
CPC .. C01B 2203/1058; Y02P 20/52; B01J 35/23; B01J 35/397; B01J 23/755
See application file for complete search history.

(56) References Cited

U.S. PATENT DOCUMENTS

| | | | |
|---|---|---|---|
| 7,105,107 | B2 | 9/2006 | Ramani et al. |
| 8,557,728 | B2 | 10/2013 | Birdsall et al. |
| 10,246,326 | B2 | 4/2019 | Chlapik et al. |
| 2004/0142815 | A1 | 7/2004 | Ramani et al. |
| 2012/0329645 | A1* | 12/2012 | Skjoth-Rasmussen ... C01B 3/40 252/373 |
| 2016/0347613 | A1 | 12/2016 | Chlapik et al. |
| 2017/0014809 | A1* | 1/2017 | Carlsson ................... C07C 1/04 |
| 2017/0173564 | A1 | 6/2017 | Ovesen et al. |
| 2017/0183228 | A1 | 6/2017 | Lin et al. |

FOREIGN PATENT DOCUMENTS

| | | |
|---|---|---|
| JP | 2011-207697 A | 10/2011 |
| JP | 2012-501843 A | 1/2012 |
| JP | 2013-103149 A | 5/2013 |
| JP | 2017-507107 A | 3/2017 |
| RU | 2650495 C1 | 4/2018 |
| WO | 2009/054830 A1 | 4/2009 |
| WO | 2010/029323 A1 | 3/2010 |
| WO | 2012/056211 A1 | 5/2012 |
| WO | 2015/132555 A1 | 9/2015 |
| WO | 2015155175 A1 | 10/2015 |
| WO | 2021138728 A1 | 7/2021 |

OTHER PUBLICATIONS

Cho, et al., "Preparation of egg-shell-type Ni/Ru bimetal alumina pellet catalysts: Steam methane reforming for hydrogen production", International Journal of Hydrogen Energy, vol. 42, pp. 18350-18357, 2017.

* cited by examiner

STEAM REFORMING

This invention relates to a process of steam reforming hydrocarbons to produce a synthesis gas and to apparatus for carrying out the process.

Synthesis gas comprises hydrogen and carbon oxides (carbon monoxide and carbon dioxide) and may contain nitrogen and other gases such as argon and low levels of methane. The synthesis gas may contain greater or lesser amounts of hydrogen and carbon oxides suited to the particular end use, such as hydrogen manufacture for refineries or fuel cells, ammonia synthesis, methanol synthesis, dimethylether synthesis or the Fischer-Tropsch process for the synthesis of liquid hydrocarbons. Synthesis gas is often produced by a steam reforming process.

In a steam reforming process, a mixture of a hydrocarbon feedstock and steam, and in some cases also carbon dioxide, is passed at an elevated pressure through particulate catalyst-filled tubes, which are externally heated by means of a suitable heating medium, generally a hot gas mixture. The particulate catalyst is normally in the form of shaped units, e.g. cylinders having a plurality of through holes, and is typically formed from a refractory support material, such as alpha-alumina, calcium aluminate or magnesium aluminate, impregnated with a suitable catalytically active metal such as nickel.

Hydrocarbon feedstocks often contain small amounts of nitrogen and this is converted into ammonia over the steam reforming catalyst. Ammonia is undesirable in the synthesis gas and is soluble in the process condensate, which is desirably returned to the process, and processes that seek to minimise its formation have been proposed.

U.S. Pat. No. 5,498,404 discloses a process for catalytical steam reforming of a nitrogen containing carbonaceous feedstock with reduced formation of ammonia, wherein the feedstock is contacted with a supported nickel catalyst further including copper in an amount of 0.01-10% by weight calculated on the amount of nickel in the catalyst. The copper containing catalyst was preferably used as a sub-layer in a fixed bed of a conventional nickel steam reforming catalyst and Example 1 indicates that the catalysts had a lower steam reforming activity as the copper content increased.

WO2009/054830 discloses reforming natural gas without excessive production of ammonia, by using a first stage of catalyst having between about 10% and about 25% nickel, a second stage of catalyst having less than 10% nickel, and a final stage having 2% or less rhodium catalyst of a low concentration. The formation of ammonia is inhibited by reducing the nickel content and surface area in the catalyst at the hottest parts of the tubes, which is towards the outlets.

However, because of the reduced nickel content in the second stage, the conversion is undesirably low, which requires the rhodium catalyst to provide an adequate synthesis gas product. Precious metal catalysts are prohibitively expensive for large-scale generation of synthesis gases in steam reformers and using mixed catalysts adds cost and complexity to the catalyst loading, operation, and discharge. Moreover, the mixed catalysts are more challenging to re-process for their metal recovery.

We have found that the ammonia formation may be reduced without resorting to the use of rhodium catalysts by using nickel steam reforming catalyst in which the nickel is present in a thin layer at the surface of the catalyst.

Accordingly the invention provides a process for steam reforming a hydrocarbon feedstock containing one or more nitrogen compounds, comprising passing a mixture of the hydrocarbon feedstock and steam through a catalyst bed consisting of one more nickel steam reforming catalysts disposed within a plurality of externally heated tubes in a tubular steam reformer, wherein each tube has an inlet to which the mixture of hydrocarbon and steam is fed, an outlet from which a reformed gas containing hydrogen, carbon monoxide, carbon dioxide, steam, ammonia and methane is recovered, and the steam reforming catalyst at least at the outlet of the tubes is a particulate eggshell steam reforming catalyst comprising 2.5 to 9.5% by weight nickel, expressed as NiO, wherein the nickel is provided in a layer at the surface of the catalyst and the thickness of layer is in the range of 100 to 1000 μm.

The hydrocarbon-containing feedstock fed to the process may comprise any gaseous or low boiling hydrocarbon feedstock, such as natural gas, associated gas, LPG, petroleum distillate, diesel, naphtha or mixtures thereof, or off-gases from chemical processes, such as a refinery off-gas or a pre-reformed gas. The hydrocarbon feedstock preferably comprises methane and may be a pre-reformed gas, an associated gas or natural gas. Natural gas is an especially preferred feedstock. The feedstock may be compressed to a pressure in the range 10 to 100 bar abs. The pressure of the hydrocarbon feedstock may usefully govern the pressure throughout the process. Operating pressure is preferably in the range 15 to 80 bar abs, more preferably 20 to 50 bar abs as this provides an enhanced performance from the process.

If the hydrocarbon feedstock contains sulphur compounds before or, preferably, after compression, the feedstock may be subjected to desulphurisation. Desulphurisation may comprise hydrodesulphurisation using CoMo or NiMo catalysts, and absorption of hydrogen sulphide using a suitable hydrogen sulphide absorbent, e.g. a zinc oxide absorbent. An ultra-purification adsorbent may usefully be used downstream of the hydrogen sulphide adsorbent to further protect the steam reforming catalyst. Suitable, ultra-purification adsorbents may comprise copper-zinc oxide/alumina materials and copper-nickel-zinc oxide/alumina materials.

To facilitate hydrodesulphurisation and/or reduce the risk of carbon laydown in the reforming process, hydrogen may be added to the compressed hydrocarbon feedstock. The amount of hydrogen in the resulting mixed gas stream may be in the range 1 to 20% vol, but is preferably in the range 1 to 10% vol, more preferably in the range 1 to 5% vol.

If the hydrocarbon feedstock contains other contaminants, such as chloride or heavy metal contaminants, these may be removed, prior to reforming, upstream or downstream of any desulphurisation, using conventional adsorbents. Adsorbents suitable for chloride removal are known and include alkalised alumina materials. Similarly, adsorbents for heavy metals such as mercury or arsenic are known and include copper sulphide materials.

Where the hydrocarbon-containing feedstock is a pre-reformed gas containing methane, this may be formed by subjecting a hydrocarbon/steam mixture to a step of adiabatic low temperature steam reforming. The hydrocarbon may be a rich natural gas, naphtha or other hydrocarbon-containing feedstock containing hydrocarbons heavier than methane. Pre-reforming processes are known. In such processes, the hydrocarbon/steam mixture is heated, typically to a temperature in the range 400 to 650° C., and then passed adiabatically through a fixed bed of a suitable particulate steam reforming catalyst, usually a precipitated catalyst having a high nickel content, for example above 40% by weight, expressed as NiO. During such an adiabatic low temperature reforming step, any hydrocarbons higher than methane react with steam to give a pre-reformed gas comprising a mixture of methane, carbon oxides and hydrogen. The use of an adiabatic reforming step, commonly termed pre-reforming, is desirable to ensure that the feed to the tubular steam reformer contains no hydrocarbons higher than methane and also contains a significant amount of hydrogen. This is desirable in order to minimise the risk of carbon formation on the catalyst in the downstream tubular steam reformer.

In the process, the hydrocarbon feedstock may contain 0.1 to 25% by volume of one or more nitrogen compounds. The content of the one or more nitrogen compounds in the hydrocarbon feedstock may be 0.5 to 25% by volume, 1 to 10% by volume, or 1 to 5% by volume. The one or more nitrogen compounds may include one or more amines but typically comprises or consists of nitrogen gas ($N_2$). The nitrogen gas content of the hydrocarbon feedstock may therefore be in the range of 0.1 to 25% by volume or 0.5 to 25% by volume, preferably 1 to 10% by volume, more preferably 1 to 5% by volume.

The feedstock may be pre-heated. It may conveniently be pre-heated after compression and before desulphurisation with a suitable heat source, such as a fired heater.

The hydrocarbon feedstock is mixed with steam to form a reforming feed gas. The steam introduction may be performed by direct injection of steam and/or by saturation of the feedstock by contact of the latter with a stream of heated water. In some embodiments, the hydrocarbon feedstock is saturated in a saturator fed with hot water to form a saturated gas mixture. The steam content of the saturated gas mixture may, if desired, be increased by the direct addition of steam. The water preferably comprises one or more of condensate streams recovered from the reformed gas, water recovered from the bottom of the saturator, and other condensate produced in the process. The amount of steam introduced is desirably sufficient to give a steam to carbon ratio of at least 1.8:1, i.e. at least 1.8 moles of steam per gram-atom of hydrocarbon carbon in the feedstock. It is preferred that the steam to carbon ratio is in the range 1.8:1 to 5:1, more preferably 2.5:1 to 3.5:1, especially 2.8:1 to 3.2:1 as this provides an optimal balance of hydrogen production and efficiency.

The reforming feed gas comprising the hydrocarbon feedstock and steam may, depending on the steam and nitrogen compound contents, contain 0.02 to 14.0% by volume, or 0.1 to 10.0% by volume or 0.2 to 6.0% by volume, of the one or more nitrogen compounds.

The reforming feed gas mixture is then desirably pre-heated prior to reforming. In a preferred embodiment, the hydrocarbon/steam mixture is heated by passing it through a fired heater. Desirably, the mixed stream is heated to an inlet temperature in the range 300 to 650° C. or 450 to 650° C., preferably 450 to 600° C., more preferably 450 to 550° C. Inlet temperatures in the range of 300 to 550° C. are particularly suitable when there is no pre-reformer and higher inlet temperatures in the range of 550 to 650° C. are particularly suitable when there is a pre-reformer.

During the reforming process, methane reacts with steam to produce hydrogen, carbon monoxide and carbon dioxide. Any hydrocarbons containing two or more carbon atoms that are present are converted to methane, carbon monoxide and hydrogen. In addition, the water-gas shift reactions occur. Overall, the process is endothermic, requiring heating of the tubes and catalyst to maintain the reaction and achieve the desired conversion. The heat input to the steam reformer is typically such that the temperature of product gas stream at the outlet of the tubes is higher than the inlet temperature, often in the range of 100 to 350 degrees Celsius higher than the inlet temperature.

The tubular steam reformer contains a plurality of tubes, usually arranged vertically, through which the gas mixture may be passed, and to which heat is transferred by means of a hot gas flowing around the exterior surfaces of the tubes. The hot gas may comprise a combustion gas or a synthesis gas. The tube inlets are typically at the top end such that the feed gas mixture is typically fed to the top of the steam reformer and flows downward through the tubes.

Thus the tubular steam reformer may have an inlet for the reforming feed gas, an outlet for a reformed gas mixture, and a plurality of vertical tubes in communication with the inlet through which the gas mixture may be passed, and to which heat is transferred by means of a hot gas flowing around the tubes in a heat exchange zone, wherein the tubes each contain one or more steam reforming catalysts provided as layers within the tubes wherein at least the layer of steam reforming catalyst adjacent the outlet is the eggshell nickel steam reforming catalyst.

The catalyst adjacent the outlets of the tubes in the process is a particulate eggshell catalyst. By the term "eggshell catalyst" we mean that the nickel in the catalyst is not uniformly distributed within the catalyst support but is concentrated at the surface and therefore forms a thin layer, with nickel being essentially absent beneath this layer. The thickness of the eggshell layer in the present invention is in the range of 100 to 1000 µm, in the range 100 to 800 µm, more preferably in the range 100 to 600 µm and particularly 200 to 600 µm. The minimum thickness of the eggshell layer may be 100 µm or preferably 200 µm. The thickness of the layer may readily be established using electron probe micro-analysis (EPMA) or optical microscopy on cross-sectioned catalysts.

The nickel in the eggshell catalyst is supported on a shaped particulate catalyst support. The shaped particulate catalyst support may be formed from any suitable material, such as a refractory metal oxide comprising alumina, titania or zirconia or an alkaline earth metal aluminate, preferably one or more calcium aluminate compounds and/or magnesium aluminate. Eggshell catalysts supported on alkaline earth metal aluminates are preferred because they have higher stability and strength in use and may be more resistant to unwanted carbon formation than alumina-supported catalysts. Calcined shaped alkaline earth metal aluminate supports may be prepared by forming a calcium aluminate cement powder and/or a magnesium aluminate powder, optionally with additional alumina and/or lime, into a shape and subsequently calcining the shape. Other oxidic materials, e.g. titania, zirconia or lanthana, may be present in the support. A particularly suitable support comprises 30 to 70% by weight of a calcium aluminate cement (comprising 65 to 85% by weight of alumina and 15 to 35% by weight of CaO) mixed with 24 to 48% by weight of alumina, 0 to 20% by weight of lime. The catalyst support may, if desired, be "alkalised" by impregnation with a solution of an alkali such as potassium hydroxide. This serves to minimise lay down of carbon on the catalyst during steam reforming resulting from high temperature cracking of hydrocarbons and from the reaction of carbon oxides with hydrogen. Alkali oxide, e.g. potash, levels of up to about 5% wt on the calcined support may be used. If desired, the catalyst support may be treated with a solution of an alkaline earth metal, such as Ca or Mg. The catalyst support is desirably shaped using known pelleting techniques but may also be prepared by extrusion. The shaped support may be in any suitable shape but preferably the support is in the form of cylinders, which may have one or more through holes. Suitable diameters for cylindrical pellets are in the range 3-40 mm and the aspect ratio (length/diameter) is preferably ≤2. The cylinders may be domed or flat-ended. More preferably the shaped support is in the form of a cylindrical pellet having between 1 and 12 holes extending there-through, especially 3 to 10 holes, preferably of circular cross section. The shaped support may additionally have between 2 and 20 flutes or channels running along the length of the pellet. Preferred shapes include a 4-hole quadralobe, a 5-hole pentalobe, a 7-hole cylinder and a 10-hole cylinder.

The eggshell catalysts may be prepared by impregnating a suitable nickel compound or salt, such as nickel nitrate or nickel acetate, into the shaped support. In order to form the desired eggshell layer, the shaped support may be treated with water to change the surface chemistry of the support, or impregnation conditions adjusted to cause deposition of the nickel just at the surface of the support.

Methods for preparing suitable eggshell catalysts are described in WO2010/125369 and WO2012/056211.

The nickel content of the eggshell catalyst, expressed as NiO, is in the range 2.5 to 9.5% by weight. Nickel contents, expressed as NiO, in the range 2.5 to 5.5% by weight are surprisingly effective and have the advantage of using less nickel than conventional steam reforming catalysts, thereby reducing exposure to the metal oxide and metal during manufacture, installation and discharge of the catalyst. The risk of self-heating of the catalyst on discharge is also reduced. Thus, one impregnation may be sufficient to generate the desired catalyst. However, if desired, impregnation may be repeated until the nickel content of the catalyst is at the desired level.

The BET surface area of the eggshell nickel catalyst may be in the range 1 to 100 $m^2/g$, preferably 2 to 80 $m^2/g$, more preferably 3 to 75 $m^2/g$.

One or more promoter compounds may also be present but are usually not necessary and their inclusion in the eggshell catalyst is less preferred. If it is wished to include a promoter, one or more promoter compounds may be included in the nickel impregnating solution or the promoter may be added previously or subsequently by a separate impregnation. The promoter may be confined to the eggshell layer or may be distributed throughout the catalyst support. Promoters include platinum group metals such as platinum, palladium, iridium, ruthenium, rhodium and gold. Lanthanide metals such as lanthanum and cerium may also be included as promoters.

Water-soluble salts, particularly nitrates, may be used as sources of the metal promoters. More than one promoter may be present and additional alkali may also be added. The amount of promoter metal, if used, will typically be in the range 0.1 to 5% wt on the active catalyst.

However, a promoter is not generally necessary in the process to achieve the required conversion with low ammonia.

There may be a single eggshell catalyst in each tube, in which case the catalyst bed in the tubes consists only of the nickel eggshell catalyst. Alternatively, there may be two, three or more layers of nickel steam reforming catalysts in the tubes wherein in each case at least the layer adjacent the outlets of the tubes is the eggshell nickel catalyst. The tubes may therefore comprise a non-eggshell steam reforming catalyst upstream of the eggshell catalyst or another different eggshell catalyst may be present. The relative amounts of the steam reforming catalysts may vary in thickness to produce the desired conversion. In some embodiments comprising a layer of non-eggshell catalyst and a layer of eggshell catalyst adjacent the outlets of the tubes, the eggshell catalyst layer may comprise 95% to 5% of the volume of the bed or may comprise 80% to 20% of the volume of the bed or may comprise 75% to 25% of the volume of the bed. The other layers of steam reforming catalyst in the catalyst bed in the remaining part of the tube may be the same or different to the eggshell nickel steam reforming catalyst.

A rhodium catalyst is not required or desirable. Accordingly, the catalyst bed consists of one or more layers of nickel steam reforming catalysts. This simplifies catalyst recovery and reprocessing and can reduce the cost of the catalyst overall. Thus, where there are two or more layers of steam reforming catalyst, the catalyst layer adjacent the outlets of the tubes is the eggshell nickel steam reforming catalyst and the other steam reforming catalyst layers, upstream of the eggshell catalyst, consist of eggshell nickel steam reforming catalysts or non-eggshell nickel steam reforming catalysts, i.e. catalysts in which the nickel is evenly distributed within the catalyst, with no other catalysts present. Suitable non-eggshell catalysts consist of nickel, and optionally potassium oxide, supported on a refractory oxide support comprising alumina or alkaline earth metal aluminate such as calcium aluminate and/or magnesium aluminate.

Where the catalyst bed consists of two or three layers of nickel steam reforming catalyst, the catalyst layers at the inlets of the tubes preferably have the same or a higher nickel content as the eggshell nickel catalyst layer adjacent the outlets. Where non-eggshell catalysts are employed upstream of the eggshell nickel steam reforming catalyst, the non-eggshell catalysts preferably have nickel contents, expressed as NiO, in the range 10% to 30% by weight. Thus, in some embodiments, the catalyst tubes may comprise or consist of two layers of nickel steam reforming catalyst wherein the catalyst layer adjacent the outlets of the tubes is the eggshell nickel steam reforming catalyst containing 2.5% to 9.5% nickel, expressed as NiO, and the catalyst layer adjacent the inlets of the tubes is a non-eggshell nickel steam reforming catalyst containing 10% to 30% nickel, expressed as NiO.

The catalyst is typically provided to the tubes of the tubular steam reformer in an oxidic form and activated by reduction of the nickel oxide, to form elemental nickel, in-situ. For example, the catalyst in oxidic form may be placed in the tubes, and the nickel oxide reduced with a reducing agent, such as a hydrogen-containing gas. Known reduction techniques may be used to generate the active catalyst for steam reforming.

Alternatively, nickel oxide in the catalyst may be reduced ex-situ and then the elemental metal coated with a thin passivating layer of oxide using an oxygen containing gas, such as air or nitrogen-diluted air. A mixture of oxygen and carbon dioxide, optionally with nitrogen, may also be used. In this way the reduced catalyst may be transported safely to the user, and the time to generate the active catalyst and quantity of hydrogen used during the subsequent activation, reduced.

Various tubular steam reformer arrangements may be used. The tubular steam reformer may be a conventional top-fired steam reformer or a side-fired steam reformer. In such reformers the hot gas used to heat the catalyst-containing tubes is provided by combusting a fuel gas using a plurality of burners disposed either at the top end or along the length of the tubes. Alternatively, the steam reformer may be a gas-heated reformer (GHR) in which the hot gas used to heat the catalyst-containing tubes may be provided by a flue-gas from a combustion process, or may be a synthesis gas generated by catalytic or non-catalytic partial oxidation of a hydrocarbon, or by autothermal reforming of a hydrocarbon and/or the reformed gas mixture. Furthermore, the hot gas may be mixed with the reformed gas that has passed through the plurality of tubes. The tubes may have a circular cross section and may have a length of 5 to 15 m and preferably a diameter in the range 5 to 30 cm. In use, the tubes operate with a temperature gradient along their length with the inlet end of the tubes cooled by the endothermic steam reforming reactions occurring over the catalyst. The temperature of the tubes and the reacting gas at the inlets may be in the range 300 to 650° C. or 450 to 650° C., preferably 450 to 600° C., more preferably 450 to 550° C. At the outlet end of the tubes where the conversion to form the synthesis gas is essentially complete, the tubes are hotter. The temperature of the tubes and the reacting gas at the outlets may be in the range 600 to 950° C.

It is possible to express the temperature of the catalyst in the tube as a bed temperature, which is an average temperature of the catalyst between the inlet and the outlet of the catalyst bed within the tube or tubes. The bed temperature may desirably be in a range of from 625 to 775° C. or from 640 to 760° C.

The reformed gas, or crude synthesis gas, is recovered from the outlets of the tubes. The reformed gas contains hydrogen, carbon monoxide, carbon dioxide, steam, ammonia and methane. The reformed gas contains some methane due to the equilibrium limitations of the process. The methane content or "methane slip" from a tubular reformer is an indication of the process efficiency. Furthermore, if not removed or converted, methane can build up in downstream processes using the reformed gas, which is undesirable, and accordingly a low methane slip is desired. Using the eggshell nickel steam reforming catalyst and suitable reaction conditions, the process is able to provide a low methane slip, e.g. below 15% by volume on a dry gas basis. The methane slip is preferably less than 10% by volume on a dry gas basis and especially less than 5% by volume on a dry gas basis where the crude synthesis gas is not subsequently subjected secondary or autothermal reforming. The term, "on a dry gas basis" discounts the steam content of the reformed gas and is used to allow comparison with other reformed gases having different amounts of steam.

Moreover, the ammonia content of the reformed gas is surprisingly very low. Without wishing to be bound by theory, the Applicants believe that the eggshell nature, i.e. the presence of the nickel only as a thin layer at the surfaces of the catalyst particles, means that the side-reaction in which ammonia is formed is inhibited. Thus, in the process the ammonia content of the reformed gas may be below 200 ppmv on a dry gas basis. In some embodiments, the ammonia content of the reformed gas may be below 100 ppmv, preferably below 50 ppmv, more preferably below 10 ppmv on a dry gas basis.

Accordingly, the invention further provides the use, as described herein, of an eggshell steam reforming catalyst comprising 2.5 to 9.5% by weight nickel, expressed as NiO, wherein the nickel is provided in a layer at the surface of the catalyst and the thickness of layer is in the range of 100 to 1000 μm, for suppression of ammonia formation during catalytic steam reforming of a nitrogen containing hydrocarbon feedstock.

The process may further comprise cooling the reformed gas to below the dew point to condense steam and then separating the liquid condensate to form a synthesis gas from the reformed gas. The condensate traps most if not all of the ammonia formed in the steam reforming process. The ammonia content of the condensate may be below 400 mg/Litre, preferably below 200 mg/Litre, more preferably below 100 mg/Litre, most preferably below 20 mg/Litre. In a preferred embodiment, at least a portion of the condensate is recycled and used to generate steam used in the steam reforming process.

The process of the present invention may be used as part of a process for the manufacture of hydrogen, methanol, dimethyl ether, olefins, ammonia, urea or hydrocarbon liquids, e.g. diesel fuels, obtained by the Fischer-Tropsch synthesis. Thus, the reformed gas may be subjected to further processing including one or more steps of cooling to below the dew point of the steam, separation of condensate, hydrogen separation, carbon dioxide separation, methanol synthesis, dimethyl ether synthesis, olefin synthesis, ammonia synthesis, or hydrocarbon liquid synthesis. Known processes may be used to accomplish these steps.

The invention is further described by reference to the following Examples and FIGS. 1 to 6, in which.

EXAMPLE 1

Figure 1:
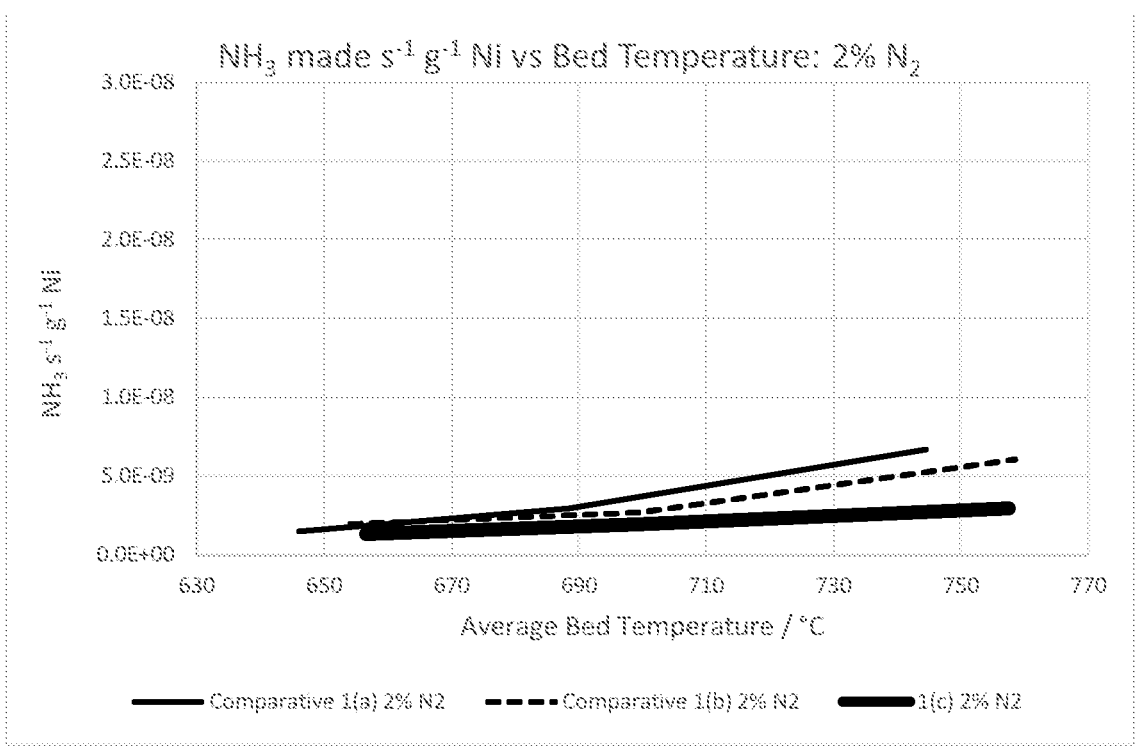
FIG. 1 is a graph depicting the ammonia produced per second per gram Ni versus bed temperature for catalysts in tests using a reformer feed containing 2% vol $N_2$.

Tests were performed with various nickel catalysts for the steam reforming of natural gas containing 1.5% vol $N_2$. Steam and nitrogen gas were combined with the natural gas such that the reforming feed gas mixture fed to the catalysts comprised 2, 5 or 8% vol $N_2$ on a wet gas basis.

The following pelleted steam reforming catalysts were tested:

| Catalyst | Shape | Catalytic metal | Support | Type | NiO content | Amount |
|---|---|---|---|---|---|---|
| 1(a) Comparative | 3.3 × 3.3 mm cylinder | Ni | Ca-aluminate | Non-eggshell | 17.6% wt | 24.94 g |
| 1(b) Comparative | 3.3 × 3.3 mm cylinder | Ni | Ca-aluminate | Non-eggshell | 7.2% wt | 22.85 g |

-continued

| Catalyst | Shape | Catalytic metal | Support | Type | NiO content | Amount |
|---|---|---|---|---|---|---|
| 1(c) Eggshell | 3.3 × 3.3 mm cylinder | Ni | Ca-aluminate | Eggshell | 5.0% wt | 22.50 g |

The non-eggshell catalysts have the nickel distributed evenly though the pellet. In the eggshell catalyst, the nickel is present only in a layer approximately 400 micrometres thick at the surface of the pellet.

The eggshell nickel catalyst was prepared according to the eggshell catalyst method of WO2010/125369. The non-eggshell catalysts were prepared according to the comparative examples in WO2010/125369.

The catalysts were tested in a laboratory scale steam reformer with a single electrically heated reformer tube with an internal diameter of about 25 mm and a length of about 2100 mm. The reactor operated on an up-flow basis. Water for generating steam was supplied to the rig via a variable stroke pump and was fed to the bottom of the reactor where it was vaporised. Natural gas was fed through a separate desulphurisation vessel before being delivered to the reactor via a thermal mass flow controller. Nitrogen and hydrogen were also be supplied to the reactor via independent mass flow controllers if required. The water and gases all entered the reactor via the same inlet pipe. The product gas exited the reactor via an outlet from the tube and was cooled to ambient temperature to condense the steam which was then collected in a catch-pot. A small volume of dry exit gas was fed to a Varian CP490 quad-channel micro GC analyser. This gas then returned to the exit gas meter to allow for a full mass balance from the reformer to be calculated.

The catalysts were diluted to approximately 100 ml with fused alumina chips (sieve fraction 3.35 mm-4.74 mm) and installed as a layer near the outlet of the reformer tube. The remainder of the tube was charged with 3.35-4.75 mm alumina chips. At the start of each test the catalyst was reduced using 50 vol % $H_2$ in $N_2$ at 600° C. for 2 hours.

Reforming was then carried out at a pressure of 27 barg using bed inlet temperatures in the range of 610 to 800° C. with a steam to carbon ratio of 3:1. Catalyst conditioning was first performed by operating the reformer at inlet temperatures of 610° C., 685° C., 735° C., 800° C., and 735° C., each for 8 hours. After conditioning, tests were performed on each of the catalysts at inlet temperatures of 685° C., 735° C. and 800° C.

Reformed gases were collected from the reformer and cooled to below the dew point to condense the steam and form condensates containing ammonia. The amount of ammonia in the condensates is proportional to the ammonia formed by the catalysts in the steam reformer. Condensate samples (250 ml) were collected over a period of 5 minutes at the end of the 8-hour test periods and analysed for their ammonia contents.

The ammonia concentrations in the condensates recovered from the reformed gases were measured using a calibrated Ion Selective Electrode (ISE). Standard solutions of 0.1, 1 and 10 ppm (w/v) ammonia were prepared. A sodium hydroxide buffer solution was added to the sample to liberate the ammonia. When the ISE voltage measurement was stable, the reading was used to generate a linear calibration curve of ISE voltage reading against log10 ammonia concentration. The ammonia concentrations of the condensates were analysed in the same way, using the ISE measured voltage reading to determine the ammonia concentration by derivation from the calibration curve.

The tests were repeated for each catalyst using feed gases containing different amounts of nitrogen. This was carried out by introducing nitrogen via a nitrogen supply line at various flows to provide the desired level in the feed gas fed to the reformer tube.

Tables showing the results of the ammonia produced in the condensates for the different catalysts for the different nitrogen contents in the feed gas are set out below.

| Comparative Catalyst 1(a) | Bed inlet temperature ° C. | $[N_2]$, vol. % | $[NH_3]$, mg/L |
|---|---|---|---|
| | 685 | 2 | 0.102 |
| | 685 | 5 | 0.226 |
| | 685 | 8 | 0.451 |
| | 735 | 2 | 0.209 |
| | 735 | 5 | 0.515 |
| | 735 | 8 | 0.901 |
| | 800 | 2 | 0.501 |
| | 800 | 5 | 1.100 |
| | 800 | 8 | 1.800 |

| Comparative Catalyst 1(b) | Bed inlet temperature ° C. | $[N_2]$, mol. % | $[NH_3]$, mg/L |
|---|---|---|---|
| | 685 | 2 | 0.050 |
| | 685 | 5 | 0.081 |
| | 685 | 8 | 0.144 |
| | 735 | 2 | 0.071 |
| | 735 | 5 | 0.210 |
| | 735 | 8 | 0.420 |
| | 800 | 2 | 0.166 |
| | 800 | 5 | 0.435 |
| | 800 | 8 | 0.807 |

| Eggshell catalyst 1(c) | Bed inlet temperature ° C. | $[N_2]$, mol. % | $[NH_3]$, mg/L |
|---|---|---|---|
| | 685 | 2 | 0.023 |
| | 685 | 5 | 0.043 |
| | 685 | 8 | 0.076 |
| | 735 | 2 | 0.035 |
| | 735 | 5 | 0.073 |
| | 735 | 8 | 0.118 |
| | 800 | 2 | 0.056 |
| | 800 | 5 | 0.187 |
| | 800 | 8 | 0.325 |

Over the range of inlet temperatures, Example 1(c) produces lower amounts of ammonia than the comparative examples. However, the catalysts contain differing amounts of nickel and have different activities. If a catalyst is more active, the amount of steam consumed will be greater than that for a less active catalyst. When this unreacted steam is condensed, it will affect the ammonia concentration. To account for this, a molar flow of water was calculated based on an oxygen balance derived from a knowledge of the feed gas composition and rate and gas-chromatography data on the reformed gas obtained using a GC system coupled to the steam reformer. The difference in the amount of oxygen entering and exiting the system can be used to determine the amount of ammonia produced per second.

Furthermore, each of the comparative examples contains more nickel. By measuring the amount of catalyst charged to the reactor precisely, it is possible to calculate the moles of ammonia per second per gram Ni.

Figure 2:
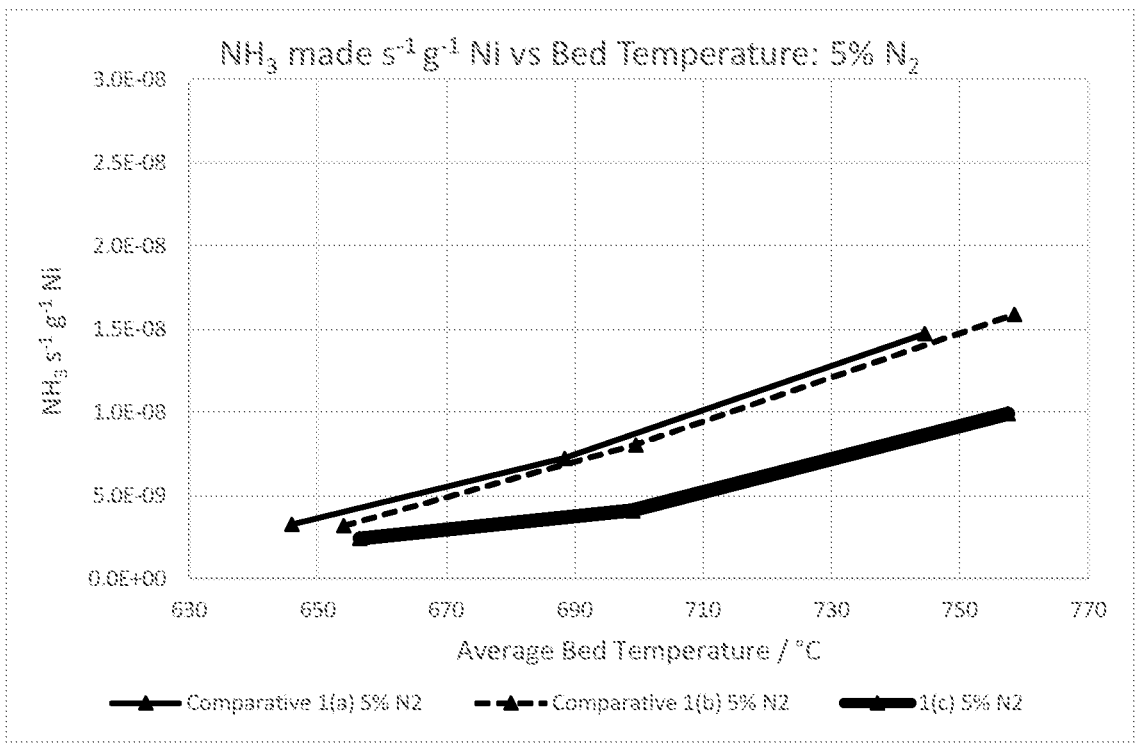
FIG. 2 is a graph depicting the ammonia produced per second per gram Ni versus bed temperature for catalysts in tests using a reformer feed containing 5% vol $N_2$.
Figure 3:
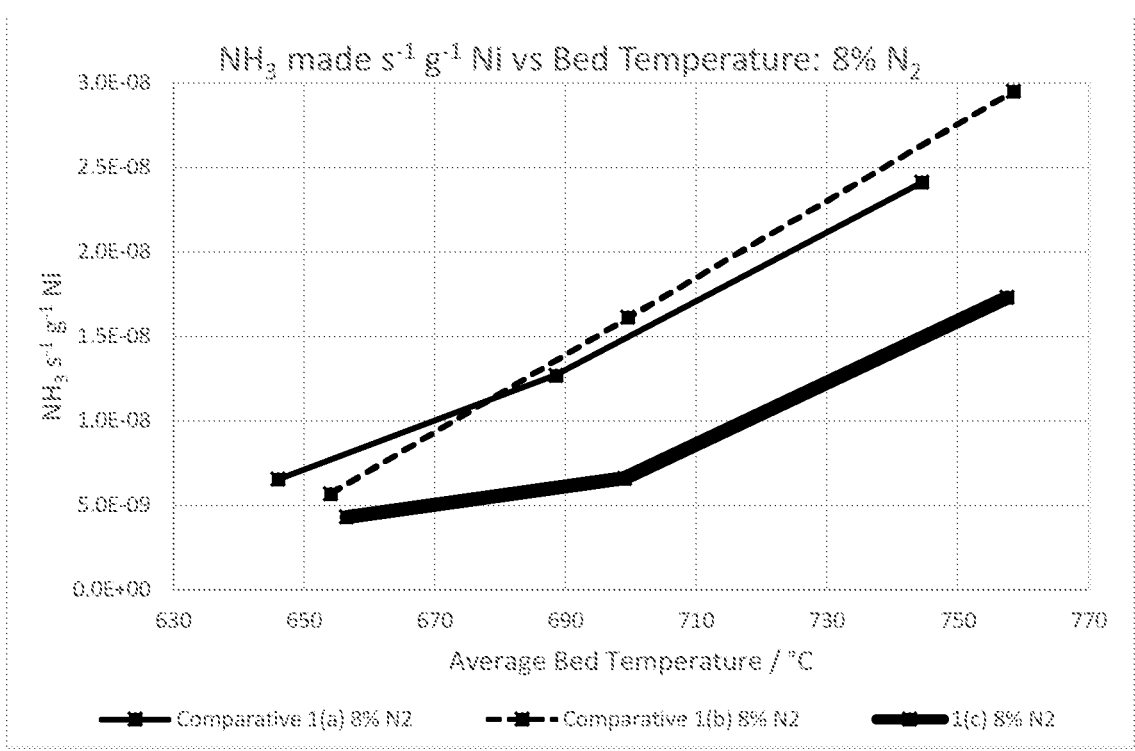
FIG. 3 is a graph depicting the ammonia produced per second per gram Ni versus bed temperature for catalysts in tests using a reformer feed containing 8% vol $N_2$.

FIGS. 1-3 depict molar ammonia concentrations of the condensates per second per gram Ni for the different nitrogen levels for each of the catalysts. This removes the differences caused by the different nickel contents of the catalysts and the varying amounts of condensate collected. It is evident that the comparative catalysts produce similar ammonia concentrations for each nitrogen level over the temperatures studied, but that the eggshell catalysts produced significantly lower amounts of ammonia, with the difference increasing in proportion to the nitrogen content of the feed gas.

The results for molar amounts of ammonia per second per gram Ni, for each of the nitrogen contents, at the inlet temperatures are set out below.

| Comparative Catalyst 1(a) | Inlet Temp., ° C. | [$N_2$], mol. % | $H_2O$ flow out, mol/hr | $NH_3$ make, (×10$^{-9}$) mol/s | $NH_3$ make per g Ni, (×10$^{-9}$) mol/s/g |
|---|---|---|---|---|---|
| | 685 | 2 | 170 | 5.1 | 1.48 |
| | 685 | 5 | | 11.3 | 3.28 |
| | 685 | 8 | | 22.6 | 6.54 |
| | 735 | 2 | 165 | 10.1 | 2.94 |
| | 735 | 5 | | 25.0 | 7.25 |
| | 735 | 8 | | 43.7 | 12.70 |
| | 800 | 2 | 157 | 23.1 | 6.71 |
| | 800 | 5 | | 50.8 | 14.70 |
| | 800 | 8 | | 83.1 | 24.10 |

| Comparative Catalyst 1(b) | Inlet Temp., ° C. | [$N_2$], mol. % | $H_2O$ flow out, mol/hr | $NH_3$ make, (×10$^{-9}$) mol/s | $NH_3$ make per g Ni, (×10$^{-9}$) mol/s/g |
|---|---|---|---|---|---|
| | 685 | 2 | 174 | 2.6 | 1.90 |
| | 685 | 5 | | 4.1 | 3.19 |
| | 685 | 8 | | 7.4 | 5.69 |
| | 735 | 2 | 169 | 3.5 | 2.70 |
| | 735 | 5 | | 10.4 | 8.06 |
| | 735 | 8 | | 20.9 | 16.10 |
| | 800 | 2 | 161 | 7.9 | 6.07 |
| | 800 | 5 | | 20.6 | 15.90 |
| | 800 | 8 | | 38.2 | 29.50 |

| Eggshell catalyst 1(c) | Inlet Temp., ° C. | [$N_2$], mol. % | $H_2O$ flow out, mol/hr | $NH_3$ make, (×10$^{-9}$) mol/s | $NH_3$ make per g Ni, (×10$^{-9}$) mol/s/g |
|---|---|---|---|---|---|
| | 685 | 2 | 173 | 1.2 | 1.31 |
| | 685 | 5 | | 2.2 | 2.43 |
| | 685 | 8 | | 3.8 | 4.30 |
| | 735 | 2 | 169 | 1.7 | 1.94 |
| | 735 | 5 | | 3.7 | 4.09 |
| | 735 | 8 | | 5.9 | 6.58 |
| | 800 | 2 | 161 | 2.7 | 2.98 |

-continued

| Eggshell catalyst 1(c) | Inlet Temp., ° C. | [$N_2$], mol. % | $H_2O$ flow out, mol/hr | $NH_3$ make, (×10$^{-9}$) mol/s | $NH_3$ make per g Ni (×10$^{-9}$) mol/s/g |
|---|---|---|---|---|---|
| | 800 | 5 | | 8.9 | 9.94 |
| | 800 | 8 | | 15.4 | 17.3 |

The temperatures depicted in FIGS. 1-3 have also been adjusted to reflect the average bed temperatures, which were calculated by taking an average of thermocouple measurements taken at the same height as the catalyst bed inlet and catalyst bed exit. This takes into account the larger endotherm observed for the more active catalysts. The results illustrate that, even taking the different nickel contents and the endotherm generated by the reforming reactions into account, the eggshell catalyst 1(c) out-performs the comparative catalysts 1(a) and 1(b) in terms of ammonia produced. Moreover, the eggshell catalyst 1(c) was able to produce a reformed gas with a high conversion of the hydrocarbons in the natural gas.

The reformed gas after condensate removal was analysed by gas chromatography to establish the conversion of hydrocarbons to hydrogen and carbon oxides. The conversion of the ethane in the natural gas is a better measurement of overall catalyst activity than methane conversion, which is reversible. The results are set out in the following Tables:

| | Catalyst Comparative Catalyst 1(a) | | | |
|---|---|---|---|---|
| Inlet Temperature | Ethane conversion (%) | 2% $N_2$ [$NH_3$]/ (×10$^{-9}$) mols$^{-1}$ | 5% $N_2$ [$NH_3$]/ (×10$^{-9}$) mols$^{-1}$ | 8% $N_2$ [$NH_3$]/ (×10$^{-9}$) mols$^{-1}$ |
| 685° C. | 52.19 | 5.1 | 11.3 | 22.6 |
| 735° C. | 59.50 | 10.1 | 25.0 | 43.7 |
| 800° C. | 74.12 | 23.1 | 50.8 | 83.1 |

| | Catalyst Comparative Catalyst 1(b) | | | |
|---|---|---|---|---|
| Inlet Temperature | Ethane conversion (%) | 2% $N_2$ [$NH_3$]/ (×10$^{-9}$) mols$^{-1}$ | 5% $N_2$ [$NH_3$]/ (×10$^{-9}$) mols$^{-1}$ | 8% $N_2$ [$NH_3$]/ (×10$^{-9}$) mols$^{-1}$ |
| 685° C. | 32.71 | 2.6 | 4.1 | 7.4 |
| 735° C. | 39.64 | 3.5 | 10.4 | 20.8 |
| 800° C. | 57.14 | 7.9 | 20.6 | 38.2 |

| | Catalyst Eggshell Catalyst 1(c) | | | |
|---|---|---|---|---|
| Inlet Temperature | Ethane conversion (%) | 2% $N_2$ [$NH_3$]/ (×10$^{-9}$) mols$^{-1}$ | 5% $N_2$ [$NH_3$]/ (×10$^{-9}$) mols$^{-1}$ | 8% $N_2$ [$NH_3$]/ (×10$^{-9}$) mols$^{-1}$ |
| 685° C. | 35.50 | 1.2 | 2.2 | 3.8 |
| 735° C. | 44.20 | 1.7 | 3.7 | 5.9 |
| 800° C. | 57.25 | 2.7 | 8.9 | 15.4 |

Figure 4:
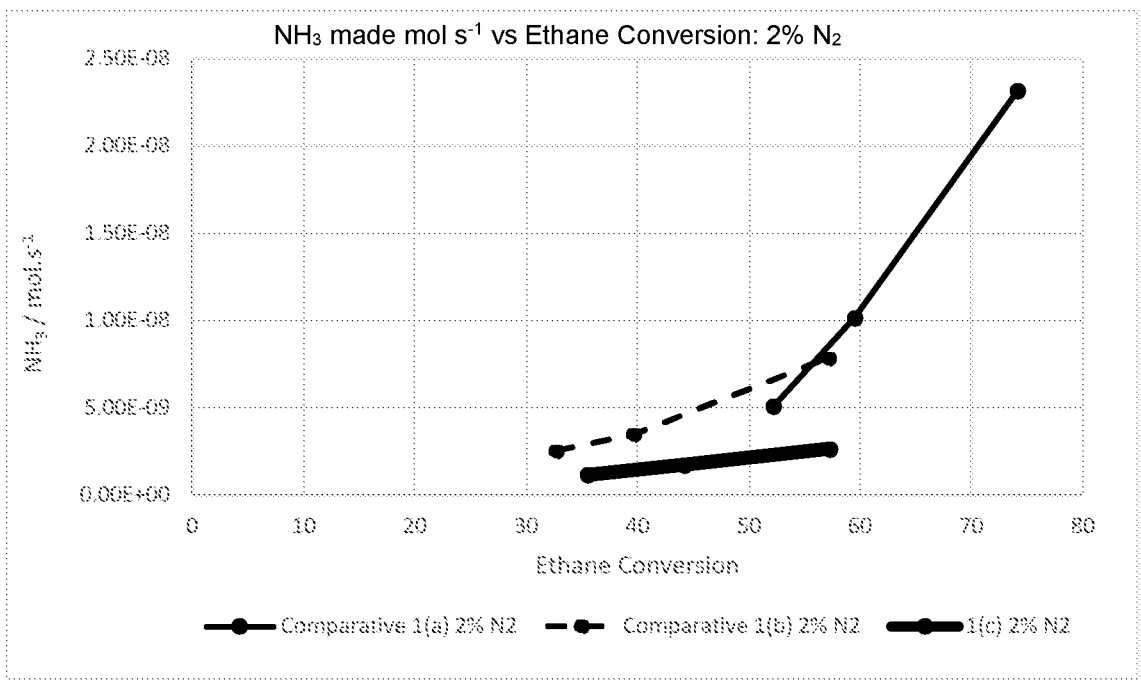
FIG. 4 is a graph depicting the ammonia produced per second versus % mol ethane conversion for catalysts in tests using a reformer feed containing 2% vol $N_2$.
Figure 5:
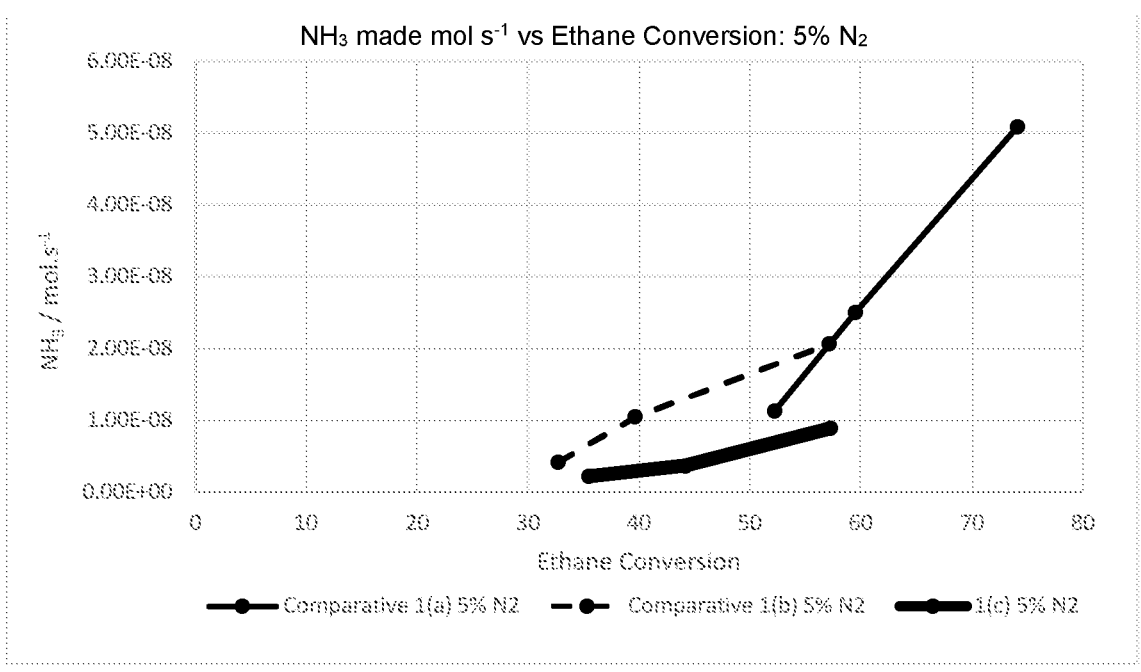
FIG. 5 is a graph depicting the ammonia produced per second versus % mol ethane conversion for catalysts in tests using a reformer feed containing 5% vol $N_2$.
Figure 6:
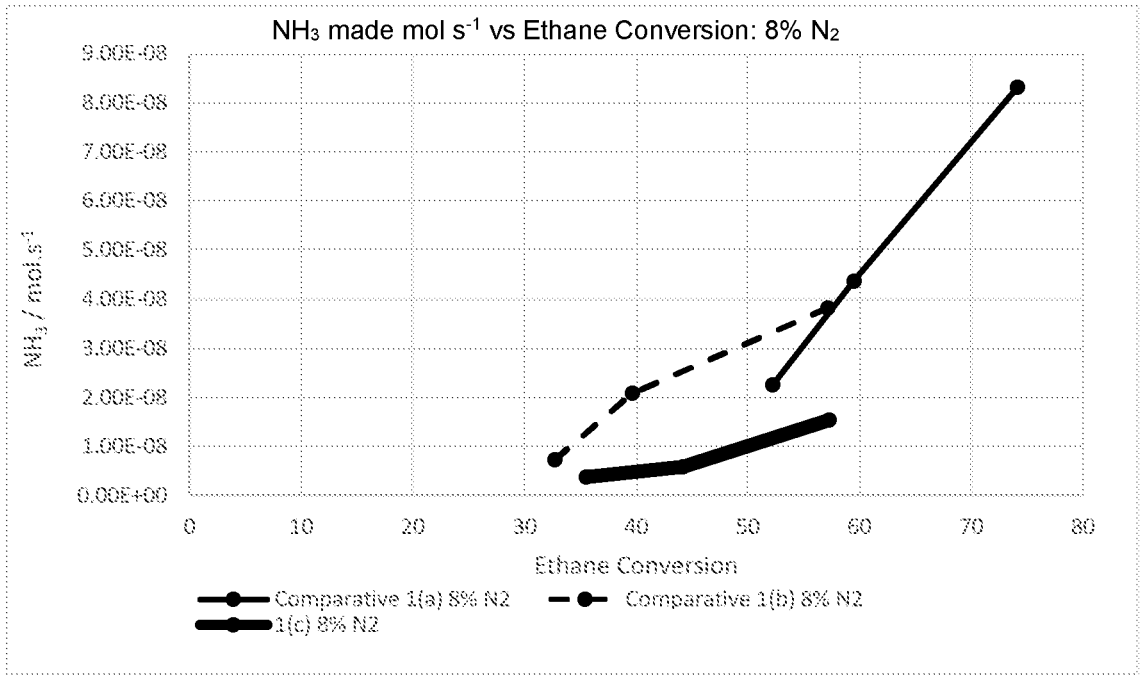
FIG. 6 is a graph depicting the ammonia produced per second versus % mol ethane conversion for catalysts in tests using a reformer feed containing 8% vol $N_2$.

These results illustrate that the eggshell catalyst 1(c), despite having a lower nickel content than Comparative Catalyst 1(b), is more active for the reforming reactions. Comparative Catalyst 1(a), which has more than three times as much nickel, is more active, however the ammonia produced is significantly higher at 2%, 5% and 8% $N_2$. This is illustrated in FIGS. 4, 5 and 6 by plotting the condensate ammonia concentrations obtained against the ethane conversion.

The invention claimed is:

1. A process for steam reforming a hydrocarbon feedstock containing 0.1 to 25% by volume of nitrogen gas ($N_2$), comprising passing a mixture of the hydrocarbon feedstock and steam through a catalyst bed consisting of two, three, or more layers of nickel steam reforming catalysts disposed within a plurality of externally heated tubes in a tubular steam reformer, wherein each tube has an inlet to which the mixture of hydrocarbon and steam is fed, an outlet from which a reformed gas containing hydrogen, carbon monoxide, carbon dioxide, steam, ammonia and methane is recovered, the layer of nickel steam reforming catalyst adjacent the inlet of the tubes is a particulate non-eggshell nickel steam reforming catalyst comprising 10-30% nickel, expressed as NiO, and the nickel steam reforming catalyst at the outlet of the tubes is a particulate eggshell steam reforming catalyst comprising 2.5 to 9.5% by weight nickel, expressed as NiO, wherein the particulate eggshell steam reforming catalyst comprises 5-95% of the volume of the catalyst bed, wherein the nickel is provided at the surface of the particulate eggshell steam reforming catalyst in a layer having a thickness of 100 to 1000 μm, and wherein the methane content of the reformed gas is less than 15% by volume on a dry gas basis and the ammonia content of the reformed gas is below 200 ppmv on a dry gas basis.

2. The process according to claim 1, wherein the nickel is provided in a layer at the surface of the particulate eggshell steam reforming catalyst and the thickness of layer is in the range of 100 to 800 μm.

3. The process according to claim 1, wherein the nickel is supported on a shaped particulate catalyst support comprising alumina, titania, zirconia, or an alkaline earth metal aluminate.

4. The process according to claim 1, wherein the hydrocarbon feedstock comprises methane, a pre-reformed gas, an associated gas or natural gas.

5. The process according to claim 1, wherein the hydrocarbon feedstock is compressed to a pressure in the range 10 to 100 bar abs.

6. The process according to claim 1, wherein the mixture of hydrocarbon feedstock and steam has a steam to carbon ratio in the range 1.8:1 to 5:1.

7. The process according to claim 1, wherein the mixture of hydrocarbon feedstock and steam is fed to the inlets of the tubes at an inlet temperature in the range 300 to 650° C.

8. The process according to claim 1, wherein the tubular steam reformer contains a plurality of tubes through which the mixture of the hydrocarbon feedstock and steam is passed, and to which heat is transferred by means of a hot gas comprising a combustion gas or a synthesis gas, flowing around the tubes.

9. The process according to claim 1, wherein the catalyst bed consists of three or more layers of the nickel steam reforming catalyst wherein in each case the layer of the nickel steam reforming catalyst adjacent the outlets of the tubes is the particulate eggshell steam reforming catalyst.

10. The process according to claim 9, wherein there are two or more layers of the nickel steam reforming catalyst within the tubes and the particulate eggshell steam reforming catalyst layer comprises 80% to 20% of the volume of the bed.

11. The process according to claim 10, wherein there are two or more layers of the nickel steam reforming catalyst within the tubes and the particulate eggshell steam reforming catalyst layer comprises 75% to 25% of the volume of the bed.

12. The process according to claim 1, wherein the process further comprises cooling the reformed gas to below the dew point to condense steam and separating a liquid condensate to form a synthesis gas from the reformed gas.

13. The process according to claim 12, wherein the ammonia content of the liquid condensate is below 400 mg/Litre.

14. The process according to claim 12, wherein at least a portion of the condensate is recycled and used to generate steam used in the steam reforming process.

15. The process according to claim 12, wherein the ammonia content of the liquid condensate is below 200 mg/Litre.

16. The process according to claim 12, wherein the ammonia content of the liquid condensate is below 100 mg/Litre.

17. The process according to claim 12, wherein the ammonia content of the liquid condensate is below 20 mg/Litre.

18. The process according to claim 1, wherein the nitrogen gas content of the hydrocarbon feedstock is in the range of 0.5 to 25% by volume.

19. The process according to claim 1, wherein the nitrogen gas content of the hydrocarbon feedstock is in the range of 1 to 10% by volume.

20. The process according to claim 1, wherein the methane content of the reformed gas is less than 10% by volume on a dry gas basis.

21. The process according to claim 1, wherein the methane content of the reformed gas is less than 5% by volume on a dry gas basis.

22. The process according to claim 1, wherein the ammonia content of the reformed gas is below 100 ppmv on a dry gas basis.

23. The process according to claim 1, wherein the ammonia content of the reformed gas is below 50 ppmv on a dry gas basis.

24. The process according to claim 1, wherein the ammonia content of the reformed gas is below 10 ppmv on a dry gas basis.

* * * * *